United States Patent
Chung et al.

(10) Patent No.: US 11,638,296 B2
(45) Date of Patent: Apr. 25, 2023

(54) LINK-BASED AUTONOMOUS CELL SCHEDULING DEVICE AND METHOD FOR IMPROVED TRAFFIC THROUGHPUT IN TSCH PROTOCOL

(71) Applicant: Pusan National University Industry-University Cooperation Foundation, Busan (KR)

(72) Inventors: Sanghwa Chung, Busan (KR); Heejun Lee, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 122 days.

(21) Appl. No.: 17/190,654

(22) Filed: Mar. 3, 2021

(65) Prior Publication Data
US 2022/0150910 A1    May 12, 2022

(30) Foreign Application Priority Data
Nov. 12, 2020  (KR) .......................... 10-2020-0151227

(51) Int. Cl.
*H04W 72/0446*  (2023.01)
*H04W 72/30*    (2023.01)
(Continued)

(52) U.S. Cl.
CPC ........... *H04W 72/542* (2023.01); *H04L 45/48* (2013.01); *H04L 47/626* (2013.01); *H04W 72/0446* (2013.01); *H04W 72/30* (2023.01)

(58) Field of Classification Search
CPC .......... H04W 72/1231; H04W 72/005; H04W 72/0446; H04W 72/1252; H04W 40/24;
(Continued)

(56) References Cited

U.S. PATENT DOCUMENTS

2019/0069315 A1* 2/2019 Raghu .................. H04W 72/23
2019/0363976 A1* 11/2019 Thu ....................... H04L 45/306
(Continued)

FOREIGN PATENT DOCUMENTS

KR    10-2018-0045590 A    5/2018
KR    10-2019-0011496 A    2/2019
(Continued)

OTHER PUBLICATIONS

Kim et al. a whitepaper on "Alice: Autonomous link-based cell scheduling for TSCH" published 2019 (Year: 2019).*
(Continued)

*Primary Examiner* — Nishant Divecha
(74) *Attorney, Agent, or Firm* — Paratus Law Group, PLLC

(57) ABSTRACT

Disclosed is a link-based autonomous cell scheduling device including: a routing information manager that records and manages information on a node's preferred parent node and child nodes in a routing information table; a slot frame manager that generates and modifies a number of slot frames by referring to routing information in the routing information table, packet queue information, and transmission/reception result information; a slot frame schedule determiner that integrates a number of slot frames to generate one integrated slot frame corresponding to a global slot frame size and record the same in an integrated slot frame table, by referring to a link unicast slot frame table, a broadcast slot frame table, and an EB slot frame table; and a TSCH MAC layer driver that operates after checking for a cell assigned to the integrated slot frame by referring to the integrated slot frame table at the TSCH MAC layer.

9 Claims, 9 Drawing Sheets

(51) Int. Cl.
*H04L 45/48* (2022.01)
*H04W 72/542* (2023.01)
*H04L 47/625* (2022.01)

(58) Field of Classification Search
CPC ...... H04W 84/18; H04L 47/626; H04L 45/48; H04L 47/50; Y02D 30/70
See application file for complete search history.

(56) References Cited

U.S. PATENT DOCUMENTS

2020/0145897 A1\* 5/2020 Jin .................... H04W 4/38
2020/0259592 A1\* 8/2020 Wu .................... H04L 1/0061
2022/0039154 A1\* 2/2022 Holcombe ............ H04W 72/56

FOREIGN PATENT DOCUMENTS

KR 10-2020-0070060 A 6/2020
KR 10-2020-0071638 A 6/2020

OTHER PUBLICATIONS

Korean Notice of Allowance for related KR Application No. 10-2020-0151227 dated Jun. 22, 2022 from Korean Intellectual Property Office.

\* cited by examiner topology

LINK-BASED AUTONOMOUS CELL SCHEDULING DEVICE AND METHOD FOR IMPROVED TRAFFIC THROUGHPUT IN TSCH PROTOCOL

CROSS-REFERENCE TO RELATED APPLICATION

This application claims priority to Korean Patent Application No. 10-2020-0151227 (filed on Nov. 12, 2020), which is hereby incorporated by reference in its entirety.

ACKNOWLEDGEMENT

This work was supported by the Korea Institute of Energy Technology Evaluation and Planning (KETEP) and the Ministry of Trade, Industry & Energy (MOTIE) of Republic of Korea (No. 20182020109660).

BACKGROUND

The present disclosure relates to an industrial wireless sensor network, and more particularly, to a link-based autonomous cell scheduling device and method for improved traffic throughput in a TSCH protocol, which can adjust the number of cells assigned to each node by varying the length of a slot frame for each link, based on a routing tree topology without additional communication overhead.

The Internet Engineering Task Force (IETF) proposed IPv6 over the TSCH mode of IEEE 802.15.4e (6TiSCH) as a standard for low-power lossy networks (LLNs) for IPv6 applications in an industrial IoT environment.

6TiSCH is a part of IEEE 802.15.4 MAC standard, with its goal of making TSCH (Timeslotted Channel Hopping) standardized in 2012 compatible with IPv6, and uses RPL (IPv6 Routing Protocol for Low-Power and Lossy Networks) with a tree topology as a routing protocol.

TSCH is a standardization technology for industrial wireless sensor networks such as Wireless HART or ISA100.11a, and provides high reliability and stability in communication through time synchronization and channel hopping. All nodes in a TSCH network work in synchronization. Nodes participating in the TSCH network broadcast an EB (enhanced beacon) containing network information, and nodes not participating in the TSCH network are able to join the network by receiving the EB.

In TSCH, data transmissions are done in timeslots, and a number of timeslots are grouped into a slot frame.

As shown in FIG. 1A and FIG. 1B, a slot frame is a two-dimensional array comprising a timeslot offset and a channel offset, and is repeated until the network is finished. A cell may be assigned to each element of the slot frame, and each cell means a wireless link between neighboring nodes. Each node in the network attempts a wireless communication at a set time and frequency according to the timeslot offset and channel offset of each cell assigned to it, and stops the communication in a timeslot during which no cell is assigned, in order to reduce energy consumption.

Each node in the network calculates the current timeslot offset by using Equation 1, and checks whether a cell corresponding to the current timeslot offset is assigned to the slot frame.

$$\text{timeslotOffsetCurr} = \text{ASN} \bmod \text{Lsf} \quad \text{[Equation 1]}$$

The ASN is the Absolute Slot Number, i.e., the total number of timeslots that are elapsed since the network is started, which is shared by all nodes in the netawork. Lsf is the number of timeslots constituting one slot frame, which is the size of the slot frame. mod refers to modular operation.

Each node in the network performs channel hopping by calculating the frequency channel corresponding to the channel offset by using Equation 2.

$$\text{channel} = F[(\text{ASN} + \text{channel offset}) \bmod \text{numChannels}] \quad \text{[Equation 2]}$$

numChannels is the number of available channels, and the corresponding channels are selected with reference to a channel index table through F[ ] function.

The TSCH network's performance, such as reliability, latency, and battery life, varies greatly depending on which timeslot and channel the cells of each node are assigned and scheduled to.

Cell scheduling may be divided into centralized scheduling in which a central scheduler schedules cells of every node, distributed scheduling in which each node performs scheduling through information exchange and negotiation with a neighboring node, and autonomous scheduling in which each node performs scheduling only by using local information or routing protocol information, without additional information exchange or negotiation with a neighboring node.

Autonomous scheduling is advantageous in that scheduling incurs no additional control traffic overhead, thus reducing the amount of traffic the network has to handle and enabling quick scheduling. In autonomous scheduling, cells are assigned by using the address of a transmitting node and the address (ID) of a receiving node. In Orchestra, which is one of the existing autonomous scheduling methods, the timeslot offset of a cell corresponding to a transmission from Node s to Node R is calculated by using Equation 3 (receiver-based) or Equation 4 (sender-based).

$$\text{timeslot offset}(sr) = \text{Hash}(\text{ID}(r)) \bmod \text{Lsf} \quad \text{[Equation 3]}$$

$$\text{timeslot offset}(sr) = \text{Hash}(\text{ID}(s)) \bmod \text{Lsf} \quad \text{[Equation 4]}$$

Hash( ) is a hash function.

Orchestra maintains three types of slot frames, i.e., EB, broadcast, and unicast.

The EB slot frame is a slot frame in which a cell sending or receiving an EB packet is assigned, and the broadcast slot frame is a slot frame in which a cell sending or receiving a control message of a routing protocol is assigned.

The unicast slot frame is a slot frame in which a cell sending or receiving a packet generated by various applications running on a node is assigned. The three types of slot frames overlap each other, and if cells of different slot frames are assigned to the same timeslot and collide with one another, the operating cell is determined according to priority (priority order of slot frames: EB>Broadcast>Unicast).

FIG. 2 shows an example of determining an actual operating cell by combining the three types of slot frames.

However, when Orchestra, a node-based autonomous cell scheduling method, is receive-based, one packet receiving cell is assigned per slot frame and each node is therefore subject to more collisions in wireless communication if they have more neighboring nodes, whereas, when Orchestra is sender-based, one transmitting cell is assigned per slot frame and each node therefore has problems such as transmission latency and packet queue overflow.

ALICE, one of the other autonomous scheduling schemes, is a link-based autonomous cell scheduling method for solving the problems of Orchestra.

ALICE solves the problems of Orchestra by assigning a cell for each link. The timeslot offset and channel offset of a cell corresponding to a transmission from Node s to Node r are calculated by using Equation 5 and Equation 6.

The ASFN is the number of slot frames that are elapsed since the network is started, which is shared by all nodes in the network. Even if cells of two different links are assigned to the same timeslot offset due to a hash collision, they are assigned to different timeslot offsets in the next slot frame due to the ASFN, thereby avoiding consecutive collisions as shown in FIG. 3.

FIG. 3 is a diagram showing a construction in which consecutive collisions in cell assignment are avoided using the ASFN of ALICE.

$$\text{timeslot offset}(sr) = \text{Hash}(a*\text{ID}(s)+\text{ID}(r)+\text{ASFN}) \bmod \text{Lsf} \quad \text{[Equation 5]}$$

$$\text{channel offset}(sr) = \text{Hash}(a*\text{ID}(s)+\text{ID}(r)+\text{ASFN}) \bmod \text{numChannels} \quad \text{[Equation 6]}$$

a is a constant for distinguishing a link from s to r and a link from r to s.

RPL is a routing protocol for a low-power lossy network proposed by the IETF ROLL Working Group.

A DODAG (Destination Oriented Directed Acyclic Graph), a tree-like routing graph, is constructed as in the topology of FIG. 1, starting from the root node serving as a gateway. All nodes of the DODAG periodically broadcast a DIO (DODAG Information Object), and nodes that have received the DIO except the root node specify one of the nodes that have sent the DIO as a preferred parent node.

The nodes transmit upstream traffic toward the preferred parent node. The nodes that have selected the preferred parent node transmit a DAO (Destination Advertisement Object) to the preferred parent node or root node, thereby forming a path to the nodes that have sent the DAO. Upstream traffic is collected toward the root node, and downstream traffic is spread through the root node.

Accordingly, nodes in a shorter hopping distance from the root node have to handle more traffic than nodes in a longer hopping distance from the root node.

ALICE allows for less collisions in wireless communication because it is a link-based scheduling method for assigning a different cell for each wireless link.

However, since only one cell is assigned for each link in one slot frame, there is a need for a technique to handle traffic in a network environment where a large volume of traffic is present. Due to the tree-like topology of RPL, the shorter the hopping distance to the root node, the greater the volume of traffic to be handled, which needs to be solved.

This creates a need for the development of a novel technology for cell scheduling that improves network performance by reducing wireless communication collisions without additional traffic overhead, provides higher traffic throughput in an area where traffic congestion may occur, and reduces unnecessary energy consumption.

PRIOR ART DOCUMENTS

Patent Documents (Patent Document 1) Korean Laid-Open Patent No. 10-2019-0011496
(Patent Document 2) Korean Laid-Open Patent No. 10-2020-0070060
(Patent Document 3) Korean Laid-Open Patent No. 10-2018-0045590

SUMMARY

The present disclosure has been made in an effort to solve the problems of industrial wireless sensor networks in the conventional art and to provide a link-based autonomous cell scheduling device and method for improved traffic throughput in a TSCH protocol, which can adjust the number of assigned cells based on traffic demand and routing tree topology without additional communication traffic overhead in a situation where various application services are in operation.

The present disclosure provides a link-based autonomous cell scheduling device and method for improved traffic throughput in a TSCH protocol, which can adjust the number of cells assigned to each node by varying the length of a slot frame for each link, based on routing tree topology without additional communication overhead, and which can reduce unnecessary energy consumption by adaptively activating or deactivating a cell based on traffic demand.

The present disclosure provides a link-based autonomous cell scheduling device and method for improved traffic throughput in a TSCH protocol, which can improve network performance by reducing wireless communication collisions through link-based autonomous cell scheduling involving the assignment of a cell in a link unicast slot frame whose size differs for each link and the activation of a cell based on traffic demand.

The present disclosure provides a link-based autonomous cell scheduling device and method for improved traffic throughput in a TSCH protocol, which provide higher traffic throughput in an area where traffic congestion may occur by increasing the number of cells associated with a link to a node with many underlying child nodes, and which can improve network performance by overcoming traffic bottleneck seen in an RPL tree structure.

Aspects of the present disclosure are not limited to the above-mentioned aspects, and other aspects that have not been mentioned will be clearly understood by those skilled in the art from the following description.

An exemplary embodiment of the present disclosure provides a link-based autonomous cell scheduling device for improved traffic throughput in a TSCH protocol, the device comprising: a routing information manager that records and manages information on a node's preferred parent node and child nodes in a routing information table; a slot frame manager that generates and modifies a number of slot frames by referring to routing information in the routing information table, packet queue information, and transmission/reception result information; a slot frame schedule determiner that integrates a number of slot frames to generate one integrated slot frame corresponding to a global slot frame size and record the same in an integrated slot frame table, by referring to a link unicast slot frame table, a broadcast slot frame table, and an EB slot frame table; and a TSCH MAC layer driver that operates after checking for a cell assigned to the integrated slot frame by referring to the integrated slot frame table at the TSCH MAC layer, wherein, in a TSCH MAC timeslot operation procedure, the ASFN is calculated after ASN adjustment, and the number of cells is calculated after the length of a link unicast slot frame for every neighboring link is adjusted.

A timeslot offset and channel offset for each wireless link between two neighboring nodes are calculated to assign a cell, and all nodes have as many different link slot frames as the number of connected links, and the length of each link's slot frame is greater than or equal to the length of a global slot frame.

The location of a cell to be assigned is determined by calculating the length of a corresponding link slot frame based on the number of underlying child nodes of a child node, which is one of the two nodes.

Only one cell is activated for each link slot frame for the duration of one global slot frame, and the remaining cells are deactivated and then activated one by one only when there is a frame to be transmitted.

An inactive cell is activated by using a morePacketToSend bit in packet transmission/reception.

A certain node n in a TSCH network has a subtree$_n$ which is a set of nodes, Node n is always contained in the path of upstream traffic toward the root node from nodes constituting the subtree of Node n, and each node in the TSCH network transmits an RPL DAO message containing its own subtree size to a preferred parent node, wherein, upon receiving the DAO, the node is able to know the subtree size of the child nodes, and calculates its own subtree size and transmits the same to its own preferred parent node.

The size of a link unicast slot frame of a link (p,c) or (c,p) between Parent Node p and Child Node c is in proportion to the subtree size of Child Node c and calculated by $$L_{ucsf}(p, c) = L_{ucsf}(c, p) = \left\lfloor L_{ucsfGlobal} \times \frac{N_{total} - \text{size }(subtree_c)}{N_{total}} \right\rfloor,$$

wherein $L_{ucsfGlobal}$ is the length of the global unicast slot frame, and $N_{total}$ is the total number of nodes constituting the TSCH network.

The timeslot offset of a cell assigned to a directional link (s,r) from Node s to Node r is calculated by timeslotoffset$_{s,r}$=Hash($a$ID($s$)+ID($r$)+ASFN)mod $L_{ucsf}$ (s,r), wherein the timeslot offsets of a cell for the link (s,r) and a cell for the link (r,s) are distinguished by using the constant a, in order to avoid collision.

The ASFN is the number of global slot frames that are elapsed since the TSCH network is started, which is calculated by ASFN=$\lfloor$ASN/$L_{ucsfGlobal}\rfloor$, wherein a cell is given a different timeslot offset for each global slot frame by adding the ASFN, so that collision in the next global slot frame is avoided even if a timeslot collision with other cells occurs.

Another exemplary embodiment of the present disclosure provides a link-based autonomous cell scheduling method for improved traffic throughput in a TSCH protocol, in which the operation of a slot frame schedule determiner of a link-based autonomous cell scheduling method for improved traffic throughput in a TSCH protocol is controlled by comprising: when a timeslot begins, updating the ASN and calculating the current timeslot offset by using the ASN; adjusting the ASFN, adjusting the length of a link unicast slot frame for every neighboring link, and checking for a cell assigned to the current timeslot offset by referring to slot frame information; in the case of a receiving cell, carrying out a packet reception procedure and activating an inactive cell corresponding to the current cell's link unicast slot frame if the packet has a morePacketToSend bit set thereto; in the case of a transmitting cell, checking the packet queue and setting a morePacketToSend bit to the packet and then carrying out a packet transmission procedure if there are more packets, i.e., two or more packets, to send to the destination; and if the packet transmission is successful, activating an inactive cell corresponding to the current cell's link unicast slot frame.

If the packet transmission is not successful, or the morePacketToSend bit is not set to the packet in the packet reception procedure, or all procedures within the timeslot are completed, a transition to sleep mode is made and the timeslot ends.

The ASN (Absolute Slot Number) is the number of timeslots that are elapsed since the network is started, which is shared by all nodes in the network, and the ASFN is the number of slot frames that are elapsed since the network is started, which is shared by all nodes in the network.

Each node in the TSCH network has a wireless link to a preferred parent node and child nodes according to the operation of an RPL routing protocol, and generates a link unicast slot frame for each link and also generates a broadcast slot frame for a control message of the RPL protocol and an EB slot frame for an EB message of the TSCH.

The above-described link-based autonomous cell scheduling device and method for improved traffic throughput in a TSCH protocol according to the present disclosure have the following advantageous effects.

Firstly, the number of assigned cells can be adjusted based on traffic demand and routing tree topology without additional communication traffic overhead in a situation where various application services are in operation.

Secondly, the number of cells assigned to each node can be adjusted by varying the length of a slot frame for each link, based on routing tree topology without additional communication overhead, and unnecessary energy consumption can be reduced by adaptively activating or deactivating a cell based on traffic demand.

Thirdly, network performance can be improved by reducing wireless communication collisions through link-based autonomous cell scheduling involving the assignment of a cell in a link unicast slot frame whose size differs for each link and the activation of a cell based on traffic demand.

Fourthly, higher traffic throughput is provided in an area where traffic congestion occurs by increasing the number of cells associated with a link to a node with many underlying child nodes, and network performance can be improved by overcoming traffic bottleneck seen in an RPL tree structure.

DETAILED DESCRIPTION

Hereinafter, exemplary embodiments of a link-based autonomous cell scheduling device and method for improved traffic throughput in a TSCH protocol according to the present disclosure will be described in detail below.

The features and advantages of the link-based autonomous cell scheduling device and method for improved traffic throughput in a TSCH protocol according to the present disclosure will become more apparent from the following detailed description of the embodiments.

Figure 1A:
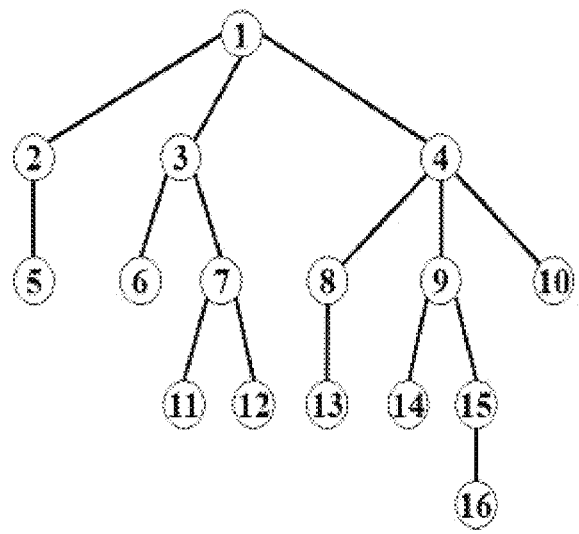
FIGS. 1A and 1B are diagrams showing a wireless network topology and an example of TSCH slot frame scheduling.
Figure 1B:
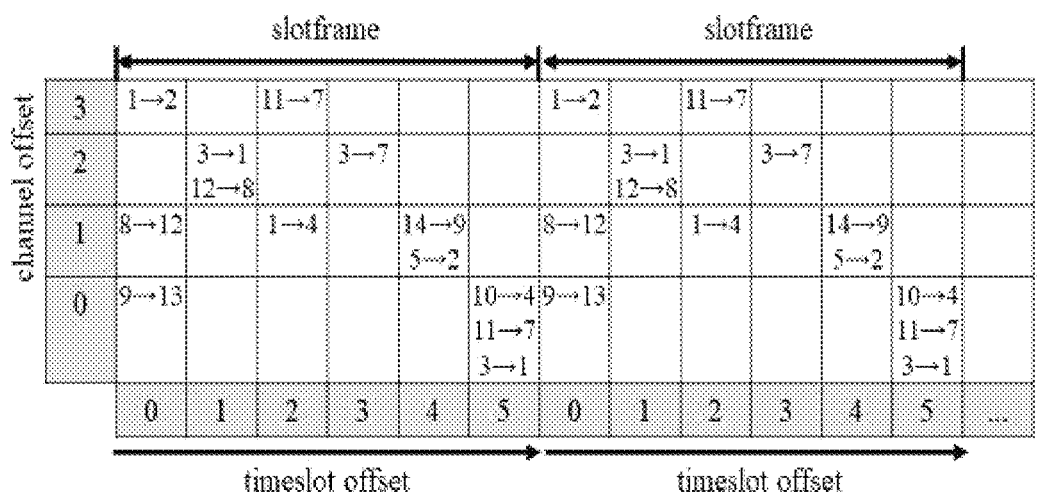
Figure 2:
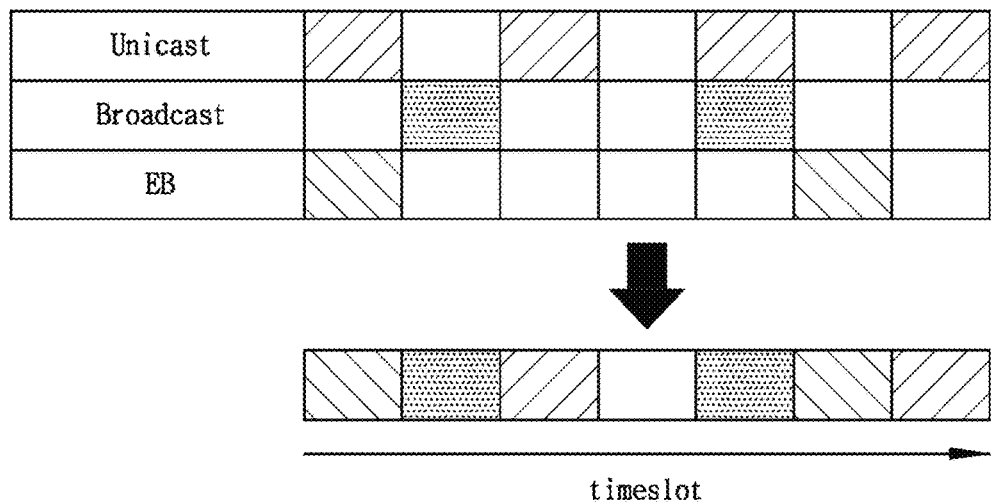
FIG. 2 is a diagram showing an example of a combination of three types of Orchestra slot frames.
Figure 3:
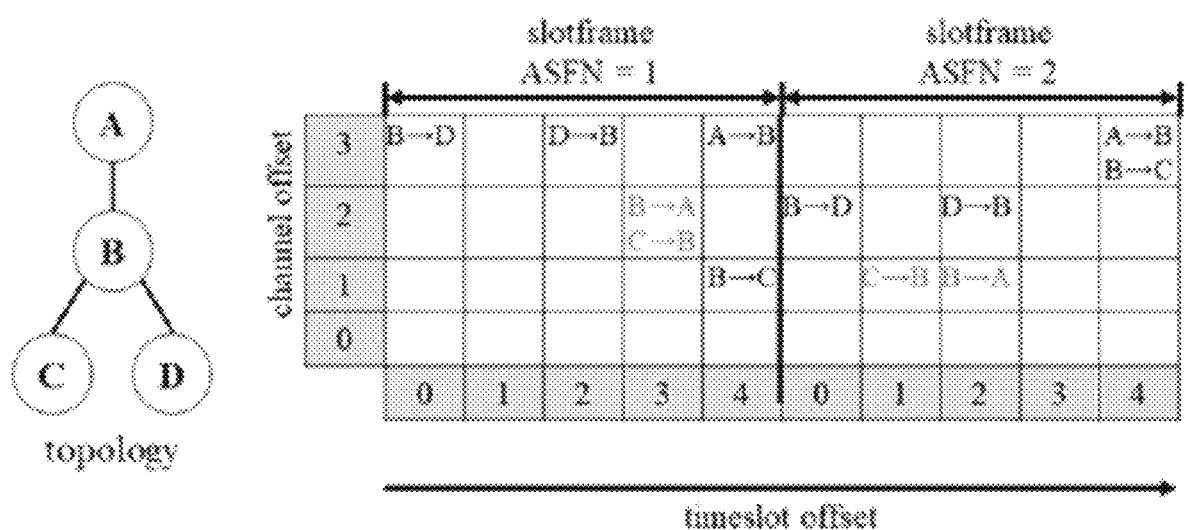
FIG. 3 is a diagram showing a construction in which consecutive collisions in cell assignment are avoided using the ASFN of ALICE.
Figure 4A:
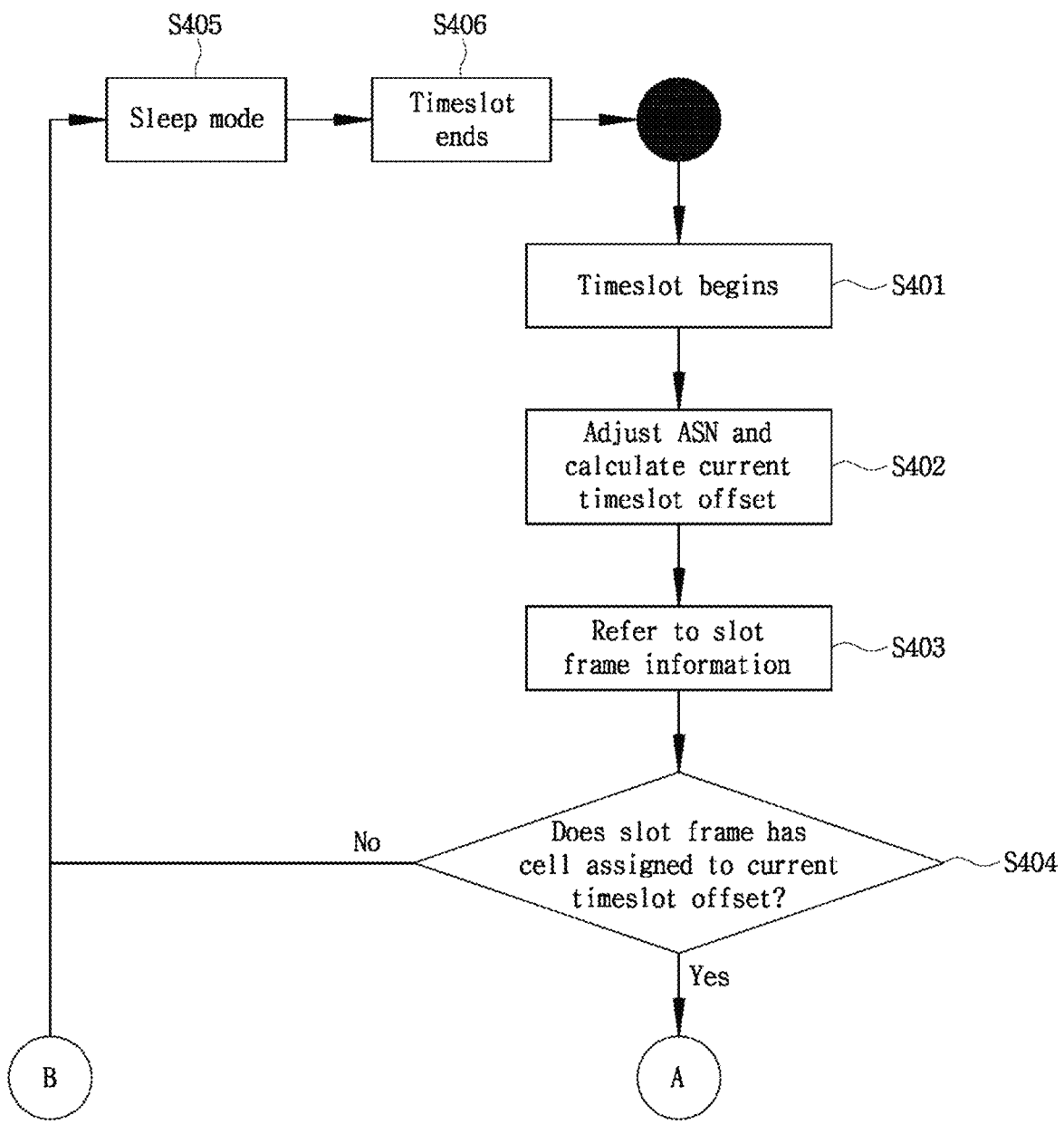
FIGS. 4A and 4B are flowchart showing a TSCH MAC timeslot operation procedure.
Figure 4B:
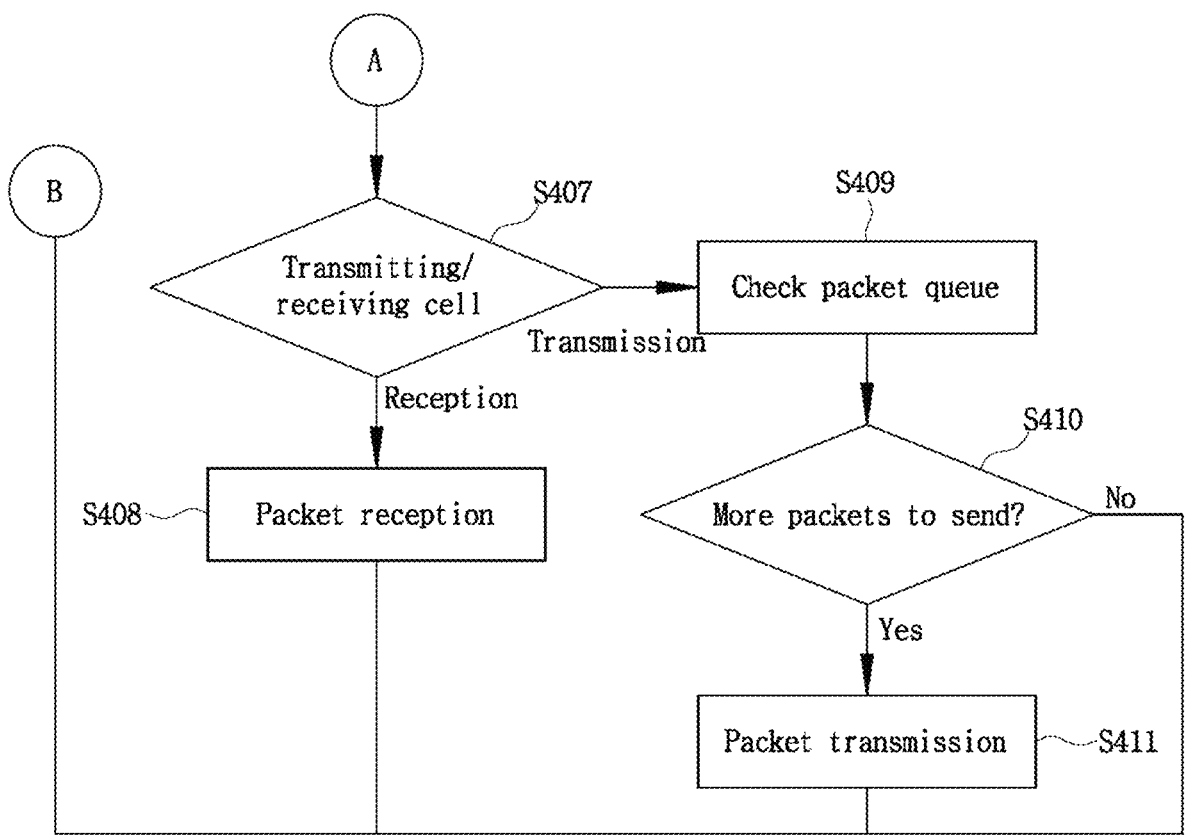
Figure 5:
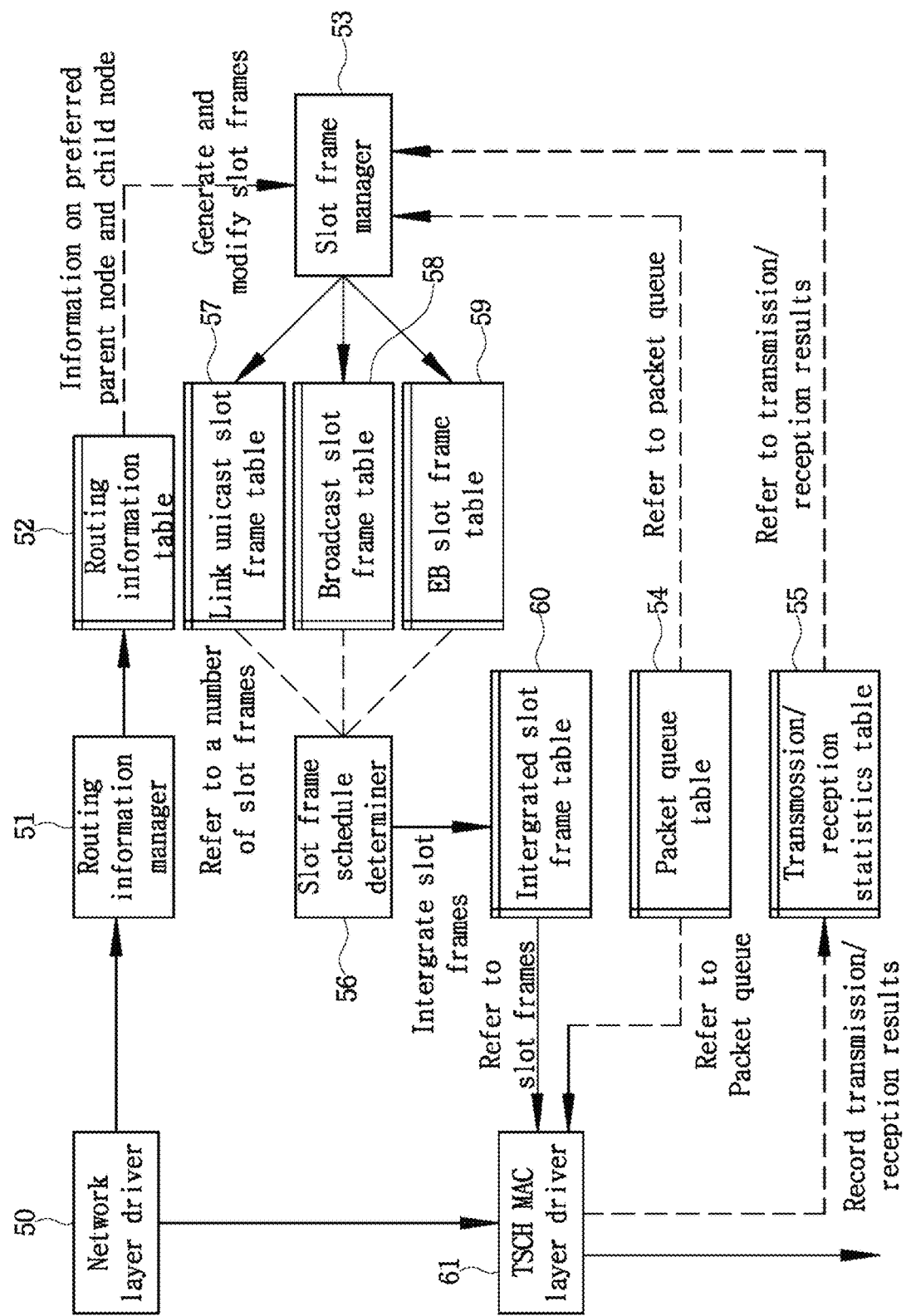
FIG. 5 is a diagram of a slot frame management structure for a TSCH device having a number of link unicast slot frames.

FIGS. 4A and 4B are flowchart showing a TSCH MAC timeslot operation procedure. FIG. 5 is a diagram of a slot frame management structure for a TSCH device having a number of link unicast slot frames.

The link-based autonomous cell scheduling device and method for improved traffic throughput in a TSCH protocol according to the present disclosure are configured to adjust the number of cells assigned to each node by varying the length of a slot frame for each link, based on routing tree topology without additional communication overhead, and to reduce unnecessary energy consumption by adaptively activating or deactivating a cell based on traffic demand.

To this end, the present disclosure comprises a construction in which a timeslot offset and channel offset for each wireless link between two neighboring nodes are calculated to assign a cell, and all nodes have as many different link slot frames as the number of connected links, and the length of each link's slot frame is greater than or equal to the length of a global slot frame.

The present disclosure may comprise a construction in which the location of a cell to be assigned is determined by calculating the length of a corresponding link slot frame is calculated based on the number of underlying child nodes of a child node, which is one of the two nodes.

Since the calculated length of a link slot frame for a wireless link connected to a node with many underlying child nodes is small, this shortens the cycle of cell assignment and assigns more cells within the same amount of time.

Moreover, in order to reduce energy consumption caused by unnecessary cell assignments, the present disclosure may comprise a construction in which only one cell is activated for each link slot frame for the duration of one global slot frame, and the remaining cells are deactivated and then activated one by one only when there is a frame to be transmitted.

In the TSCH MAC timeslot operation procedure, as shown in FIGS. 4A and 4B, when a timeslot begins (S401), the ASN is updated and the current timeslot offset is calculated by using the ASN (S402).

It is checked whether there is a cell assigned to the current timeslot offset (S404) by referring to slot frame information (S403).

In the case of a receiving cell (S407), a packet reception procedure is carried out (S408), and, in the case of a transmitting cell (S407), the packet queue is checked (S409). If there is a packet to send (S410), a packet transmission procedure is carried out (S411).

Once all procedures within the timeslot are completed, a transition to sleep mode is made (S405) and the timeslot ends (S406).

Each node in the TSCH network has a wireless link to a preferred parent node and child nodes according to the operation of an RPL routing protocol, and generates a link unicast slot frame for each link.

Moreover, a broadcast slot frame for a control message of the RPL protocol and an EB slot frame for an EB message of the TSCH are generated as well.

FIG. 5 shows a slot frame management structure for a TSCH device having a number of link unicast slot frames.

The link-based autonomous cell scheduling device and method for improved traffic throughput in a TSCH protocol according to the present disclosure comprises, as shown in FIG. 5, comprises a network layer driver 50 that operates according to the RPL protocol and generates routing information, a routing information manager 51 that records and manages information on a node's preferred parent node and child nodes in a routing information table 52, a slot frame manager 53 that generates and modifies a number of slot frames by referring to routing information in the routing information table 52, packet queue information in a packet queue table 54, and transmission/reception result information in a transmission/reception statistics table 55, a slot frame schedule determiner 56 that integrates a number of slot frames to generate one integrated slot frame corresponding to a global slot frame size and record the same in an integrated slot frame table 60, by referring to a link unicast slot frame table 57, a broadcast slot frame table 58, and an EB slot frame table 59, and a TSCH MAC layer driver 61 that operates after checking for a cell assigned to the integrated slot frame by referring to the integrated slot frame table 60 at the TSCH MAC layer.

Figure 6:
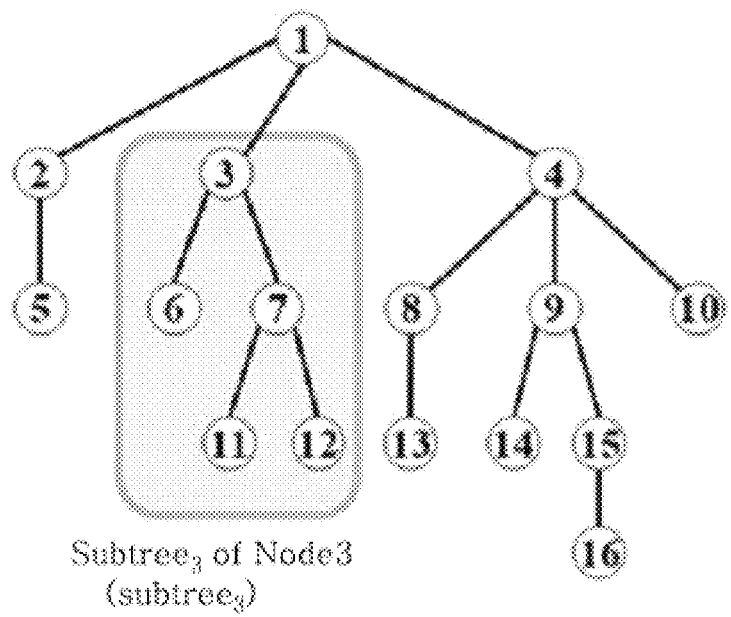
FIG. 6 is a diagram of a subtree$_3$ topology of Node 3.

FIG. 6 is a diagram of a subtree$_3$ topology of Node 3.

As shown in FIG. 6, Node n in a TSCH network has a subtree$_n$ which is a set of nodes.

Node n is always contained in the path of upstream traffic toward the root node from nodes constituting the subtree of Node n. Each node in the TSCH network transmits an RPL DAO message containing its own subtree size to a preferred parent node.

Upon receiving the DAO, the node is able to know the subtree size of the child nodes, and calculates its own subtree size and transmits it to its own preferred parent node.

In a tree structure of RPL, the traffic throughput of a corresponding node differs depending on the number of nodes in the subtree. A node with a larger number of nodes constituting the subtree has a larger volume of upstream traffic to be delivered to the root node and a larger volume of downstream traffic to be received from the root node and delivered.

In the present disclosure, the size of a link unicast slot frame becomes smaller as the subtree size of a node with which the link unicast slot frame is associated becomes larger, and this results in shortening the cycle of timeslots assigned to cells and assigning more cells within the same timeslot.

Each node generates a link unicast slot frame whose size differs for each link.

The size of each link unicast slot frame is smaller than or equal to the length of a global unicast slot frame shared by all nodes.

The size of a link unicast slot frame of a link (p,c) or (c,p) between Parent Node p and Child Node c is in proportion to the subtree size of Child Node c and calculated by Equation 7:

$$L_{ucsf}(p, c) = \\ L_{ucsf}(c, p) = \left\lfloor L_{ucsfGlobal} \times \frac{N_{total} - \text{size }(subtree_c)}{N_{total}} \right\rfloor,$$

[Equation 7]

wherein $L_{ucsfGlobal}$ is the length of the global unicast slot frame, and $N_{total}$ is the total number of nodes constituting the TSCH network.

In an industrial environment, network nodes may be managed by an administrator, and it is not difficult to figure out the total number of nodes. In a case where the correct total number of nodes cannot be figured out, Ntotal may be replaced with an appropriate number.

The timeslot offset of a cell assigned to a directional link (s,r) from Node s to Node r is calculated by Equation 8:

$$\text{timeslotoffset}_{sr}(s,r) = \text{Hash}(a\text{ID}(s)+\text{ID}(r)+\text{ASFN}) \bmod L_{ucsf} \quad [\text{Equation 8}]$$

wherein the timeslot offsets of a cell for the link (s,r) and a cell for the link (r,s) are distinguished by using the constant a, in order to avoid collision.

The ASFN is the number of global slot frames that are elapsed since the TSCH network is started, which is calculated by Equation 9:

$$\text{ASFN} = \lfloor \text{ASN}/L_{ucsfGlobal} \rfloor \quad [\text{Equation 9}]$$

wherein a cell is given a different timeslot offset for each global slot frame by adding the ASFN, so that collision in the next global slot frame is avoided even if a timeslot collision with other cells occurs.

Figure 7:
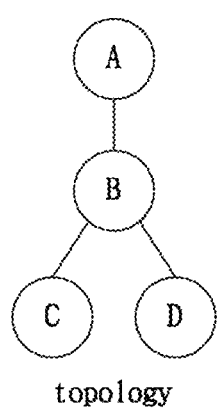
FIG. 7 is a diagram showing an example of the assignment of a cell in a link unicast slot frame whose size differs for each link.
Figure 7:
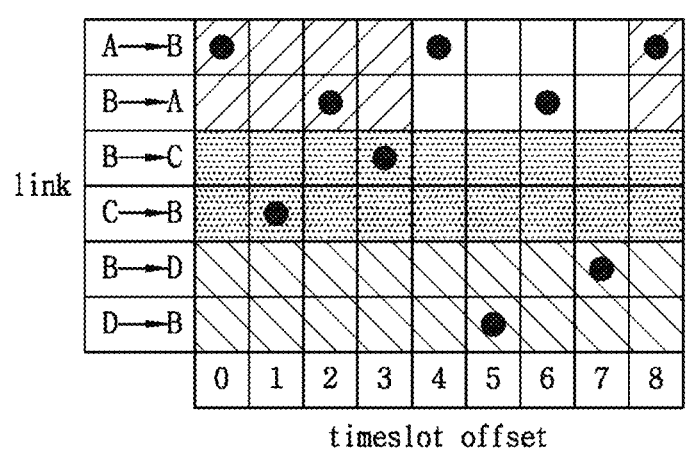

FIG. 7 is a diagram showing an example of the assignment of a cell in a link unicast slot frame whose size differs for each link.

FIG. 7 shows an example of the assignment of a cell in a link unicast slot frame whose size differs for each link when $L_{ucsf}(A,B)=L_{ucsf}(B,A)=4$, $L_{ucsf}(B,C)=L_{ucsf}(C,B)=9$, and $L_{ucsf}(B,D)=L_{ucsf}(D,B)=9$.

The black dots represent assigned cells, and the background color represent the elapse of link unicast slot frames.

This shows that more cells are assigned to a link if the link is associated with a node whose subtree contains more nodes.

A node integrates a number of slot frames to generate an integrated slot frame corresponding to the length of a global unicast slot frame. If cells collide with each other in the same timeslot in a number of slot frames, the cell to be assigned to the integrated slot frame is selected according to the priority of the slot frames.

The node operates in accordance with the integrated slot frame.

By allocating a different unicast slot frame for each link, more cells may be assigned to the generated link unicast slot frame. However, unnecessary cell assignments will increase the battery consumption of the node and increase the possibility of inter-cell collision.

Therefore, the present disclosure comprises a construction in which a cell is activated or deactivated based on the traffic to be handled.

Since the length of every link unicast slot frame is smaller than or equal to the length of the integrated slot frame, a number of cells in the same link unicast slot frame may be assigned to a single integrated slot frame.

At this point, only the first cell in each link unicast slot frame within the integrated slot frame is activated, and the remaining cells are deactivated.

In the timeslots of the inactive cells, the node operates as if no cell is assigned.

When Node s attempts to transmit a unicast packet ucp to Node r, if there are more packets in the packet queue to be sent to Node r, apart from ucp, a morePacketToSend bit is set to the packet ucp and then the packet ucp is sent.

Having received the packet, Node r checks for the morePacketToSend bit in the received packet, and, if the packet has the morePacketToSend bit set to it, activates the next inactive cell in the link unicast slot frame for the link (s,r). If the transmission is successful, Node s also activates the next inactive cell in the link unicast slot frame for the link (s,r).

Figure 8:
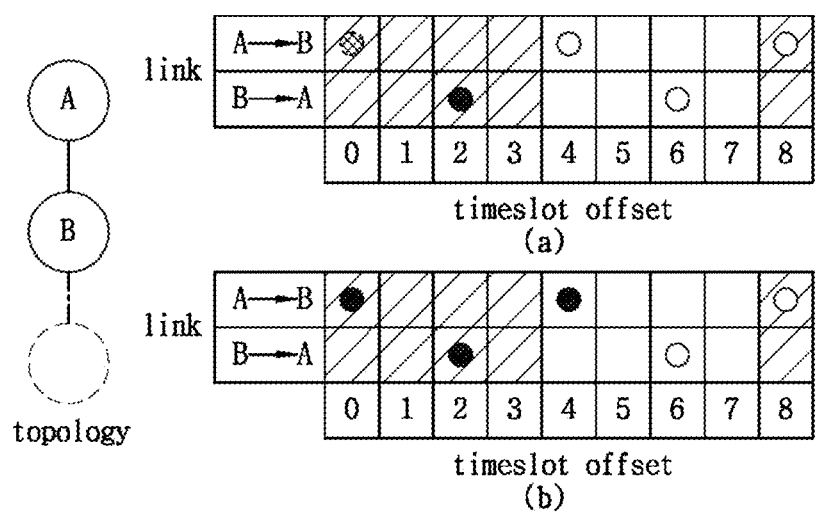
FIG. 8 is a diagram showing the activation of a cell based on traffic demand.

FIG. 8 is a diagram showing an example of the scheduling of a cell in a link unicast slot frame when the activation of a cell based on traffic demand is applied.

In the link (A,B), cells other than those in the timeslot offset 0 are inactive.

In the timeslot offset 0, Node A finds out that there are more packets to send to Node B in the packet queue, and then sets a morePacketToS end bit to that packet and sends the packet to Node B.

Node B acknowledges the morePacketToSend bit in the received packet and activates the inactive cell in the timeslot offset 4. Likewise, Node A activates the same cell, thereby enabling communication in the timeslot offset 4.

Figure 9A:
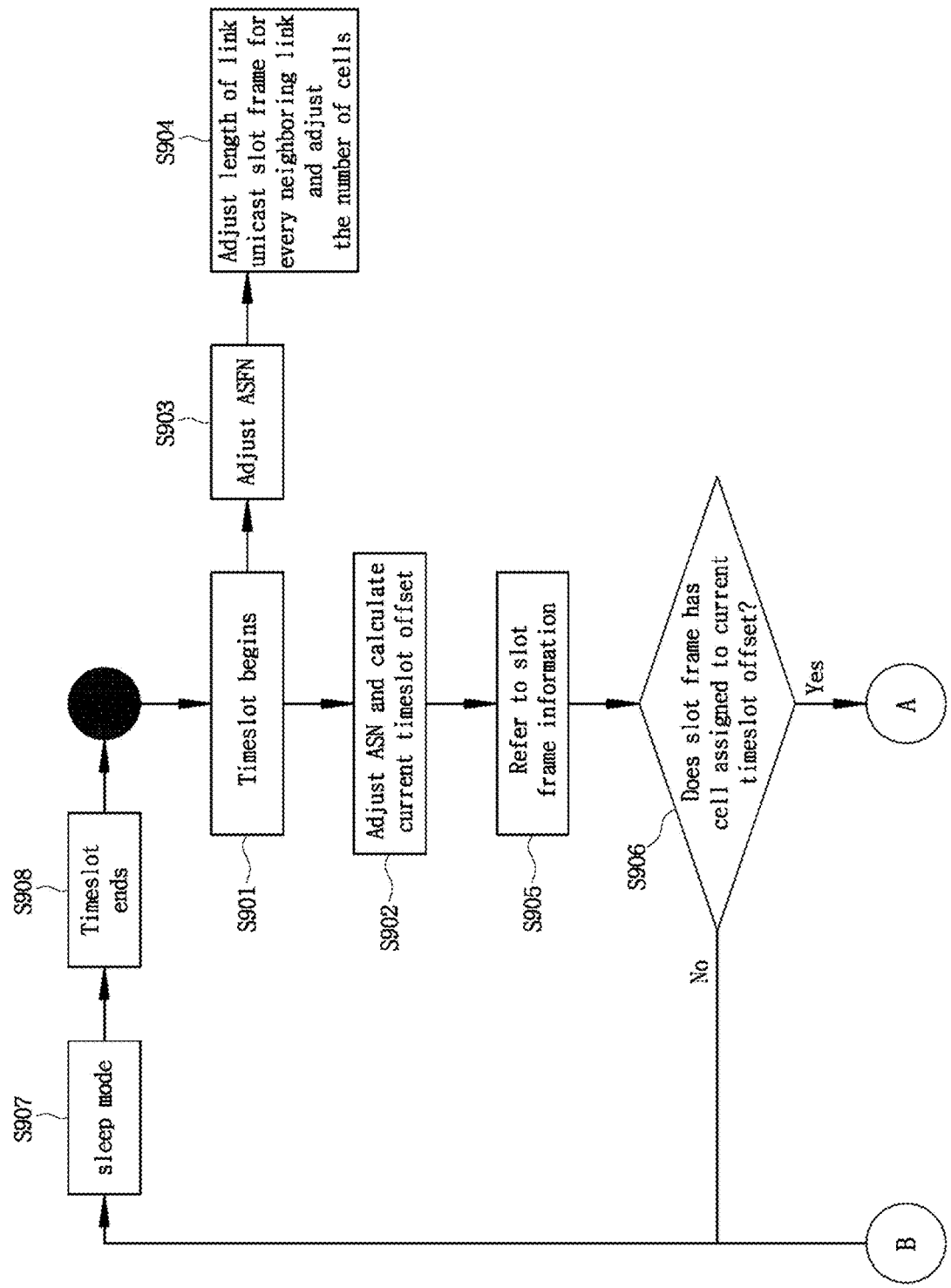
FIGS. 9A and 9B are flowchart showing a TSCH MAC timeslot operation procedure which uses a different link unicast slot frame for each link and a cell activation technique based on traffic demand.
Figure 9B:
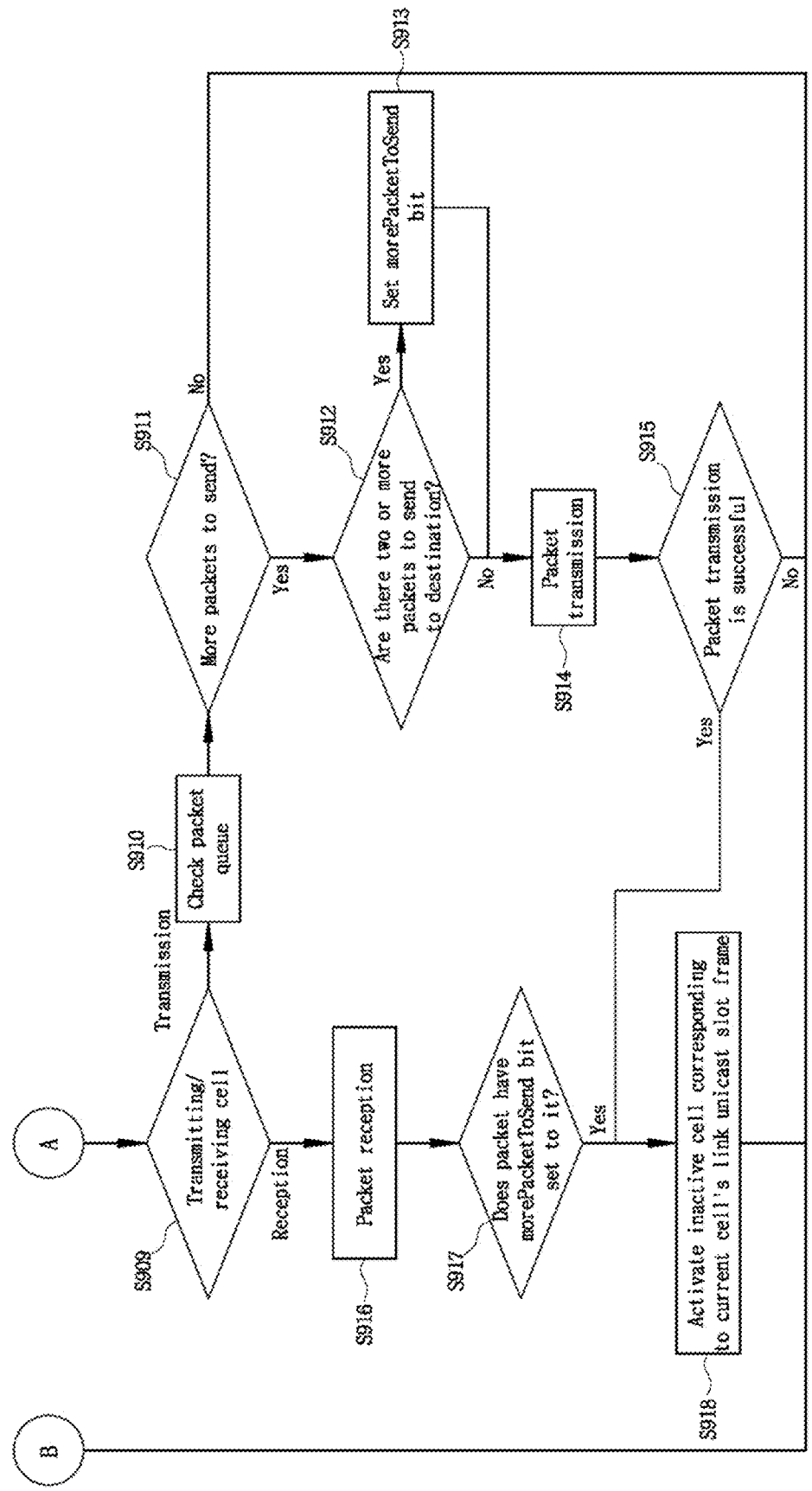

FIGS. 9A and 9B are flowchart showing a TSCH MAC timeslot operation procedure which uses a different link unicast slot frame for each link and a cell activation technique based on traffic demand.

In the TSCH MAC timeslot operation procedure, the ASFN is calculated after ASN adjustment, and the number of cells is calculated after the length of a link unicast slot frame for every neighboring link is adjusted.

Moreover, inactive cells are activated by using the morePacketToSend bit in packet transmission/reception.

In an enhanced TSCH MAC timeslot operation procedure according to the present disclosure, as shown in FIGS. 9A and 9B, when a timeslot begins (S901), the ASN is updated and the current timeslot offset is calculated by using the ASN (S902).

The ASN (Absolute Slot Number) is the number of timeslots that are elapsed since the network is started, which is shared by all nodes in the network.

Subsequently, the ASFN is adjusted (S903), and the length of a link unicast slot frame for every neighboring link is adjusted (S904).

The ASFN is the number of slot frames that are elapsed since the network is started, which is shared by all nodes in the network.

It is checked whether there is a cell assigned to the current timeslot offset (S906) by referring to slot frame information (S905).

In the case of a receiving cell (S909), a packet reception procedure is carried out (S916), and, if the packet has a morePacketToSend bit set to it (S917), an inactive cell corresponding to the current cell's link unicast slot frame is activated (S918).

In the case of a transmitting cell (S909), the packet queue is checked (S910). If there are more packets to send (S911)—that is, two or more packets to send to the destination (S912), a morePacketToSend bit is set to the packet (913) and then a packet transmission procedure is carried out (S914).

If the packet transmission is successful (S915), an inactive cell corresponding to the current cell's link unicast slot frame is activated (S918).

If the packet transmission is not successful, or the morePacketToSend bit is not set to the packet in the packet reception procedure, or all procedures within the timeslot are completed, a transition to sleep mode is made (S907) and the timeslot ends (S908).

Likewise, each node in the TSCH network has a wireless link to a preferred parent node and child nodes according to the operation of an RPL routing protocol, and generates a link unicast slot frame for each link.

Moreover, a broadcast slot frame for a control message of the RPL protocol and an EB slot frame for an EB message of the TSCH are generated as well.

The above-described link-based autonomous cell scheduling device and method for improved traffic throughput in a TSCH protocol according to the present disclosure can improve network performance by reducing wireless communication collisions through link-based autonomous cell scheduling involving the assignment of a cell in a link unicast slot frame whose size differs for each link and the activation of a cell based on traffic demand.

The link-based autonomous cell scheduling device and method for improved traffic throughput in a TSCH protocol according to the present disclosure provide higher traffic throughput in an area where traffic congestion may occur by increasing the number of cells associated with a link to a node with many underlying child nodes, and which can improve network performance by overcoming traffic bottleneck seen in an RPL tree structure.

Those skilled in the art will appreciate that the present disclosure can be implemented in modified forms without departing from the essential features of the present disclosure.

Therefore, the disclosed embodiments should be considered in descriptive sense only and not for purposes of limitation. Therefore, the scope of the present disclosure is defined not by the detailed description of the present disclosure but by the appended claims, and all modifications within a range equivalent to the scope of the appended claims should be construed as being included in the present disclosure.

DETAILED DESCRIPTION OF MAIN ELEMENTS

| | |
|---|---|
| 50: Network layer driver | 51: Routing information manager |
| 52: Routing information table | 53: Slot frame manager |
| 54: Packet queue table | 55: Transmission/reception statistics table |
| 56: Slot frame schedule determiner | 57: Link unicast slot frame table |
| 58: Broadcast slot frame table | 59: EB slot frame table |
| 60: Integrated slot frame table | 61: TSCH MAC layer driver |

What is claimed is:

1. A link-based autonomous cell scheduling method for improved traffic throughput in a Timeslotted Channel Hopping (TSCH) protocol, the method comprising:
   recording and managing information on a node's preferred parent node and child nodes in a routing information table;
   generating and modifying a number of slot frames by referring to routing information in the routing information table, packet queue information, and transmission or reception result information;
   integrating the number of slot frames to generate one integrated slot frame corresponding to a global slot frame size and record the one integrated slot frame in an integrated slot frame table, by referring to a link unicast slot frame table, a broadcast slot frame table, and an enhanced beacon (EB) slot frame table;
   checking the integrated slot frame table at a TSCH media access control address (MAC) layer for a cell assigned to the integrated slot frame; and
   calculating, in a TSCH MAC timeslot operation procedure, an Absolute SlotFrame Number (ASFN) after Absolute Slot Number (ASN) adjustment, and calculating a number of cells assigned to the integrated slot frame after a length of a link unicast slot frame for every neighboring link is adjusted.

2. The link-based autonomous cell scheduling method of claim 1, wherein a timeslot offset and channel offset for each wireless link between two neighboring nodes are calculated to assign a cell to the integrated slot frame, and all nodes have as many different link slot frames as a number of connected links, and a length of each link's slot frame is greater than or equal to a length of a global slot frame.

3. The link-based autonomous cell scheduling method of claim 2, wherein a location of the cell to be assigned is determined by calculating a length of a corresponding link slot frame based on the number of underlying child nodes of a child node, which is one of the two neighboring nodes.

4. The link-based autonomous cell scheduling method of claim 2, wherein only one cell is activated for each link slot frame for a duration of the global slot frame, and remaining cells are deactivated and then activated one by one only when there is a frame to be transmitted.

5. The link-based autonomous cell scheduling method of claim 4, wherein the one cell being an inactive cell is activated by using a morePacketToSend bit in packet transmission or reception.

6. The link-based autonomous cell scheduling method of claim 2, wherein the node is a certain Node n in a TSCH network and has a subtree$_n$ which is a set of nodes, Node n is always contained in a path of upstream traffic toward a root node from nodes constituting a subtree of Node n, and each node in the TSCH network transmits an IPv6 Routing Protocol for Low-Power and Lossy Networks (RPL) Destination Advertisement Object (DAO) message containing its own subtree size to a preferred parent node,
   wherein, upon receiving the DAO, the node is able to know a subtree size of the child nodes, and calculates its own subtree size and transmits the node's own subtree size to the node's preferred parent node.

7. The link-based autonomous cell scheduling method of claim 6, wherein, in the TSCH network, a size of a link unicast slot frame of a link (p,c) or (c,p) between Parent Node p and Child Node c is in proportion to a subtree size of Child Node c and calculated by $$L_{ucsf}(p, c) = L_{ucsf}(c, p) = \left\lfloor L_{ucsfGlobal} \times \frac{N_{total} - \text{size }(subtree_c)}{N_{total}} \right\rfloor,$$

wherein $L_{ucsfGlobal}$ is a length of a global unicast slot frame, and $N_{total}$ is a total number of nodes constituting the TSCH network.

8. The link-based autonomous cell scheduling method of claim 7, wherein the timeslot offset of the cell assigned to a directional link (s,r) from Node s to Node r is calculated by timeslotoffset$_{s,r}$=Hash($a$ID($s$)+ID($r$)+ASFN)mod $L_{ucsf}$ $(s,r)$, wherein the timeslot offsets of a cell for the link (s,r) and a cell for a link (r,$) are distinguished by using a constant a, in order to avoid collision, and
   wherein ID(s) is an address of the Node s and ID(r) is an address of the Node r.

9. The link-based autonomous cell scheduling method of claim 8, wherein the ASFN is a number of global slot frames that are elapsed since the TSCH network is started, which is calculated by ASFN=⌊ASN/L$_{ucsfGlobal}$⌋, wherein a cell is given a different timeslot offset for each global slot frame by adding the ASFN, so that collision in the next global slot frame is avoided even if a timeslot collision with other cells occurs.

* * * * *